Dec. 9, 1924.                                                          1,518,413
                              W. E. ROSS
                  MOUNTING FOR WHEEL DRESSING TOOLS
                        Filed May 16, 1921
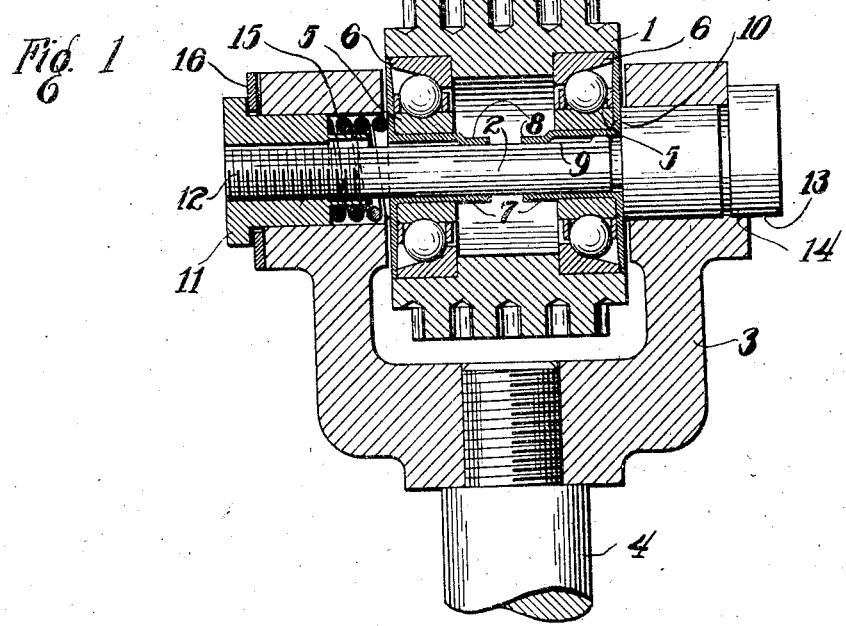
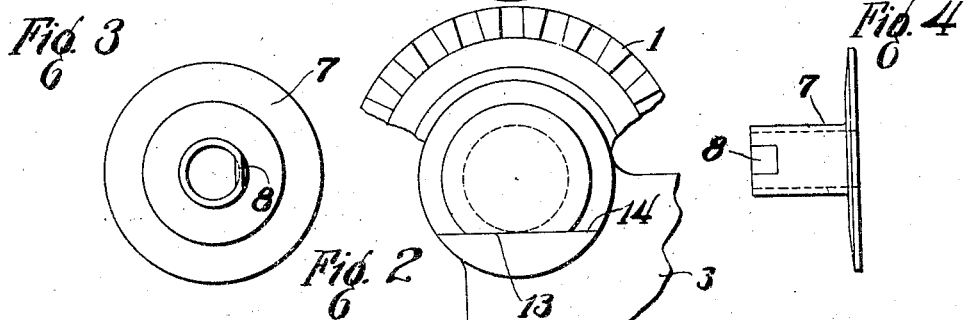
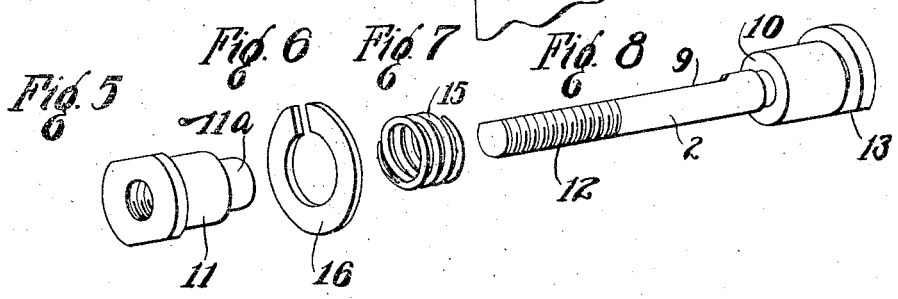
Witness                                                Inventor
                                                       William E. Ross
J. L. Brown.                              By Wilkinson, Huxley, Byron & Knight
                                                               Attys.

Patented Dec. 9, 1924.

1,518,413

UNITED STATES PATENT OFFICE.

WILLIAM E. ROSS, OF CHICAGO, ILLINOIS.

MOUNTING FOR WHEEL-DRESSING TOOLS.

Application filed May 16, 1921. Serial No. 469,938.

*To all whom it may concern:*

Be it known that I, WILLIAM E. Ross, a citizen of the United States, residing at Chicago, in the county of Cook and State of Illinois, have invented certain new and useful Improvements in Mountings for Wheel-Dressing Tools, of which the following is a specification.

This invention relates to antifriction bearings for rolls or other rotary members which are required to be supported with accuracy without restricting their freedom of revolution; and will be herein illustrated as applied to wheel dressing tools which embody in their organization a roll having a substantially cylindrical surface and which revolves freely while its surface is in contact with the surface of the wheel to be dressed. In wheel dressing tools of this kind, and particularly where the dimension of the cylindrical dressing surface has considerable extent in the direction of the axis of the cylinder, it is very important that the dressing roll be supported with extreme rigidity with reference to its axis of revolution without imposing any restriction upon its freedom of revolution under the frictional drive of the wheel surface upon which it is operating. Moverover, it is necessary that these conditions of accuracy of support and freedom of revolution be maintained notwithstanding wear on the parts as the tool continues in use.

It has long been the practice to support the roll of the dressing tool through the medium of anti-friction bearings mounted upon a spindle, supported in the arms of a forked frame, and to provide abutments for the bearings at the opposite ends of the roll which hold them closely together to keep the bearings tight, these abutments being relatively adjustable so that the axial pressure upon the bearings might be changed at will. But two serious objections have arisen in constructions heretofore employed for accomplishing this result. In the first place, one or both of the arms of the forked frame have been utilized as an abutment or abutments for the bearings so that in drawing the bearing tight, through means of the spindle acting as a bolt, the fork has necessarily been sprung so that the inner face or faces of the fork, which might be originally dressed to a plane accurately perpendicular to the axis of the spindle, would no longer remain in such relation and would bear unevenly upon the cone or cones of the bearing, with the result that the roll was inaccurately sustained and would develop vibration in its revolution; moreover, the use of an inner face of the fork as an abutment involves expensive dressing of such face. Again, experience has shown it to be inadvisable to have the bearings adjustable at the will of the operator, because many workmen will either neglect the adjustment of the dressing tool or will adjust the bearings too tightly, with the result that the original desideratum of extreme accuracy of support with perfect freedom of revolution will not be maintained.

Now the present invention has for one of its objects to provide an improved antifriction mounting for the rolls of wheel dressing tools, which will hold the roll with great accuracy under different adjustments that may be imparted to the bearings; and, accordingly, one feature of the invention consists in providing the forked frame with a spindle to receive the anti-friction bearings that support the roll, which spindle has a seat that fixes it radially, and preferably longitudinally as well, in one fork of the frame, and has a shoulder that is presented beyond the inner face of said fork when the spindle is seated therein in order to constitute the axial abutment of the anti-friction bearing at that end of the roll; a nut threaded upon the opposite end of the spindle and which acts axially against the anti-friction bearings, preferably indirectly through the medium of a compression spring, being employed as the bearing abutment at the other end of the roll, so that at neither end of the roll is the inner face of the frame relied on to support the bearing, and any springing of the frame under the tightening of the nut will still leave the faces of the abutment normal to the axis of revolution. When, as in the preferred embodiment of this part of the invention, the adjusting nut has a cylindrical body which is accurately fitted in the bore of the fork it further contributes to the accuracy of support of the spindle, and when an interposed spring between the nut and the bearing constitutes the immediate abutment at that end of the roll, and the nut is adjusted until its head brings up tightly against the outside of the fork and a head on the spindle is brought tightly against the outside of the opposite fork as in the preferred embodiment of the invention, the mounting is rendered still more accurate.

Another object of the invention is to provide means for automatically taking up looseness in the bearings of the roll of a dressing tool of the kind described and maintaining accuracy of support at all times or with very much less attention to the condition of the bearing; and, accordingly, another feature of the invention consists in introducing a compression spring between the anti-friction bearing and the abutment which sustains the bearing at one end of the roll, and preferably in an organization in which one abutment is afforded by a shoulder on the spindle, and the spindle is drawn axially to develop initial compression of the spring and determine the sustaining pressure upon the bearing; the preferred embodiment of this part of the invention including the feature of utilizing the shoulder on the spindle as a direct bearing abutment at one end of the roll and sustaining the spring under compression as the bearing abutment at the other end of the roll; placing the spring under compression by drawing the spindle inward; and preferably also including the use of the nut which draws the spindle, as the abutment for the spring, so that the spring is housed in the bore of the fork in which the nut is centered.

A distinct advantage arises from combining the two portions of the invention above referred to, and particularly when embodied in the preferred form, in that by utilizing the nut to draw the head of the bolt to a longitudinal seating against one fork, while the nut is seating against the other fork, the parts may be so proportioned that the spring which constitutes one abutment will be initially placed under compression exactly suitable for the bearing adjustment desired and cannot thereafter be compressed to a greater degree; in other words, the tool can be given into the hands of the operative with assurance that the bearing will remain accurate and without opportunity for tampering with the adjustment.

In the accompanying drawings—

Figure 1 is an axial section of a tool embodying the several features of the present invention.

Figure 2 is a fragmentary elevation of the right-hand end of Figure 1.

Figures 3 and 4 are, respectively, an end elevation and a side elevation of one of the bushings that support the anti-friction bearing upon the spindle.

Figures 5, 6, 7, and 8 show in axial alinement but segregated, respectively, the nut, lock washer, spring, and spindle employed in Figure 1.

1 represents the dressing roll, 2 the spindle, 3 the forked frame, and 4 the shank of the tool which may correspond in construction and design substantially with corresponding parts heretofore employed in tools of this character.

It has been the practice to support the roll 1 upon the spindle 2 through means of combined radial and thrust ball bearings comprising inner raceways 5 and outer raceways 6. It has also been proposed to support such bearings upon the spindle 2 through the medium of flanged bushings 7 longitudinally adjustable on the spindle to press the inner raceways 5 axially inward with relation to the outer raceways 6 that are sustained by the roll 1 in order to maintain accurate bearing between the balls and the raceways. In this adjustment it is preferable to hold the bushing 7 against rotation upon the spindle 2. This has heretofore been accomplished by means of a spline or key inserted into the bushing and the spindle. But I prefer to accomplish this by the means described in my application Serial No. 452,119, which comprises flattened faces 8 upon the bushings 7 and corresponding flattened face 9 upon the spindle 2 to receive said faces.

To firmly mount the spindle 2 in the frame 3 and adjustably sustain the combined radial and thrust bearings, the present invention provides an enlargement or shoulder 10 upon the spindle 2 through which it fits accurately in one fork of the frame 3 and affords abutment for one of the bushings 7, and applies to the opposite end of said spindle a headed nut 11 adjustably fitted thereon through the medium of threads 12 in a manner to support the opposite bushing 7. Spindle 2 is provided with a face 13 upon its enlarged end and seats upon the face 14 of the fork of the frame that receives it and holds the spindle against rotation with the nut 11. Nut 11 fits very accurately in the fork of the frame 3 which receives it, and together with the enlarged end of the spindle 2 rigidly centers the spindle in the frame. Nut 11 does not bear directly against the bushing 7 but presses the same through the medium of a helical compression spring 15 so that when the nut 11 is screwed up to develop proper pressure through the medium of the spring, the bearings will be kept tight indefinitely and a serious cause of inferiority in the work of tools of this kind will thereby be avoided. The head of nut 11 seats through the medium of a split lock washer 16 against the outer face of the fork that receives it, and this prevents backing off of the nut 11 under the vibration of the tool when in use, and insures continued tightness of the bearings and accurate support of the dressing roll An important feature of my invention resides in the fact that the shoulder 10 and spring 15 sustain the adjustable members of the bearings out of contact with the inner faces of the frame 3. Another important feature resides in the fact that spindle 2 is seated immovably in the frame and is held in its seat by the nut 11. Another important feature resides in the fact that initial adjustment is accomplished through means of the nut 11, and spring 15 will take up any looseness that may develop in the bearing at any time without further adjustment of the nut 11.

I claim:

1. In a device of the character described a frame, a spindle mounted at one end in said frame having a shoulder presented inwardly beyond the frame, a rotary member, adjustable bearings mounting said rotary member on said spindle, a nut drawing the spindle in the direction to press its said shoulder against the bearing at one end of the rotary member, and a compression spring acting against the bearing at the other end of the rotary member, longitudinally of the spindle, and in opposition to said shoulder.

2. In an antifriction bearing of the character described, a frame, a spindle fixedly seated in the frame, a rotating member, bearings mounting said member on said spindle, and a nut drawing the spindle to its seat in the frame and imparting adjustment to said bearings; an axially acting spring being interposed between the nut and a bearing.

3. In a device of the character described, a frame, a spindle having an end through which it is fixedly supported in said frame and a shoulder at said end providing an axially presented abutment on the inner side of the frame, a rotary member, bearings mounting said member upon the spindle and adapted to be sustained by said abutment, and a nut on the opposite end of the spindle drawing the first-mentioned end to its seat and presenting the bearings against such abutment; said nut fitting the frame and centering the spindle with relation thereto, and having an axially acting compression spring through which it sustains the bearing.

4. In a device of the character described, a spindle, a rotary member, adjustable ball bearings supporting said rotary member upon said spindle, means for adjusting said bearings including an abutment sustaining the bearings axially at one end of the roll, and a spring having a support holding it under compression and causing it to act axially against the bearings at the other end of said member and in opposition to said abutment.

5. In a device of the character described, a spindle, a rotary member, adjustable ball bearings supporting said member upon said spindle, means for adjusting said bearings including an abutment sustaining the bearings axially at one end of said member, and a spring having a support holding it under compression and causing it to act axially against the bearings at the other end of said member and in opposition to said abutment; means being provided for varying the distance between the spring support and the abutment and thereby determining the compression upon the spring.

6. In a tool for dressing the surfaces of grinding wheels, a frame, a dressing roll, bearings for said roll adjustably related thereto, a spindle in said frame supporting said roll through the medium of said bearings and having a shoulder through which it acts in one axial direction to impart adjustment to the bearings, means for imparting longitudinal movement to the spindle in said direction, and a spring resiliently sustaining the bearings against said adjustment.

7. In a grinding wheel dressing tool, a support, a spindle mounted in said support, a dressing roll, ball bearings supporting said dressing roll upon said spindle, a spring surrounding the spindle and acting against said bearings in the direction of the axis of the spindle, at one end of said roll, means supporting the bearings at the other end of the roll in opposition to said spring, and screw threaded means compressing said spring and determining its pressure against the bearings.

8. In a tool for dressing grinding wheels, a support, a spindle mounted in said support and having at one end a head seated against the support, a dressing roll, ball bearings mounting said roll upon said spindle and having an abutment at the end of the roll adjacent said head, a compression spring surrounding the spindle at the other end of the roll and acting against the bearings in opposition to said abutment, and a nut on the spindle at said other end of the roll, seated against the frame, drawing the head of the spindle against the frame, and compressing the spring and causing the latter to press against the bearings.

Signed at Chicago, Illinois, this 11th day of May, 1921.

WILLIAM E. ROSS.